Patented Feb. 9, 1943

2,310,231

UNITED STATES PATENT OFFICE 2,310,231

BRAZING SOLDER

Melvin M. Goldsmith, Chicago, Ill., assignor to Goldsmith Bros. Smelting & Refining Company, a corporation of West Virginia No Drawing. Application March 3, 1941, Serial No. 381,595

4 Claims. (Cl. 75—173)

This invention relates to an improved brazing solder.

Brazing solders, or hard solders are employed for soldering purposes where the ordinary soft solders have not sufficient strength, or do not have sufficient corrosion resistance. Such brazing solders preferably have a melting point as low as 1175° or thereabouts, although in some cases they are prepared with melting points as high as 1350° F.

The basis of most brazing solders is silver, although in many of them copper predominates. Silver and copper are employed in order to give strength to the solder, but the melting points of these metals, or mixtures of them, are too high for the purposes desired. Therefore, various metals have been used to lower the melting point. Zinc is the most common of these. Zinc alone, however, has a tendency to make the solder non-free flowing or stiff, and other metals are frequently used to make the solder flow more freely. Cadmium is a typical example of such a metal.

Silver and zinc form a eutectic with about 4 to 1 ratio of silver to zinc. Although the presence of other metals affects the eutectic ratio considerably, in preparing the present alloy or solder it is preferred that silver predominate greatly over the zinc.

In accordance with the present invention the melting point of silver-containing brazing solders is lowered markedly by the inclusion therein of a very small percentage of sodium metal. The amount of the sodium is ordinarily 1% to 2%, and should be less than 5%. Strangely enough, while sodium does not markedly lower the melting point of silver or zinc when added to either of them in small proportions, a minor amount does markedly affect a silver copper alloy, particularly in the presence of zinc. Even amounts as low as 0.05% markedly affect the solder. In addition to its advantage in lowering the melting point, however, the sodium makes the solder extremely penetrating, partially because it is possible to eliminate considerable zinc. It also reduces the tendency to oxidation, and the potential alkalinity of the sodium is of value in counteracting oxidation and acidity. The solder is, therefore, unusually corrosion resistant.

The solder should be free flowing at a melting point below 1350° F. and have a composition essentially within the following range:

| | Per cent |
|---|---|
| Sodium | 0.05 to 5 |
| Silver | 5 to 85 |
| Copper | 0 to 50 |
| Zinc | 0 to 35 |
| Cadmium | 0 to 15 |
| Phosphorus | 0 to 1.5 |

Compositions may be chosen from the above formula which have melting points as low as 1100° F. or as high as 1550° F., at various degrees of cost and workability. Preferably the alloy will melt below 1350° F. and small amounts of other metals may be employed without altering the general character of the alloy. The sodium may be replaced in whole or in part by potassium.

In the higher grade, higher cost alloys the following range of materials is preferred:

| | Per cent |
|---|---|
| Sodium | 0.5 to 2.5 |
| Silver | 40 to 60 |
| Copper | 12 to 24 |
| Cadmium | 8 to 14 |
| Zinc | 15 to 22 |

A particularly free flowing group of solders, of quite low melting point, may be produced within the following range:

| | Per cent |
|---|---|
| Sodium | 1 to 2 |
| Silver | 48 to 52 |
| Zinc | 17 to 21 |
| Cadmium | 11 to 13 |
| Copper | 16 to 20 |

A preferred solder is composed of the following ingredients:

| | Per cent |
|---|---|
| Silver | 50 |
| Copper | 18 |
| Zinc | 19 |
| Sodium | 1 |
| Cadmium | 12 |

The amount of cadmium is considerably less than is customarily employed in such solders because the sodium itself acts to make the solder more free flowing. This is a real advantage since the presence of cadmium is generally avoided so far as possible.

The above alloy would have a melting point of about 1350° F. without the sodium, whereas with it the melting point is approximately 1175° F.

With such an alloy no flux is needed, whereas fluxes are now generally employed. The sodium, being much more powerful as a reducing agent than any structural metal, has a considerable tendency to eliminate any small amounts of oxide which may be present. Apparently, partially on this account it has been found to wet the metals quite readily.

In preparing the alloy the sodium is preferably alloyed with the zinc. This may be done by melting the zinc and immersing the sodium in it while protecting the whole from air by the use of a cover. An effective cover may be produced by the use of sugar, which promptly forms charcoal, and a small amount of borax sufficient to bind the particles of charcoal together.

It is possible to incorporate the sodium with the silver, although on account of the high melting point of the silver this is not so desirable. Where an exclusively silver and copper material is employed this procedure should be followed however, because the sodium does not readily combine with the copper, if at all.

In the above solders in addition to the replacement of the sodium in whole or in part by potassium, the silver may be replaced in whole or in part by gold. The gold alloys or solders are particularly valuable in jewelry and dental work.

Small amounts of tin may be employed, particularly in gold alloys. In gold alloys the amount of cadmium is ordinarily quite low.

Aluminum may be employed in small amounts in the alloys.

The following is an example of an alloy containing no zinc or cadmium:

| | Per cent |
|---|---|
| Silver | 14 |
| Sodium | .2 to 1.5 |
| Copper | Balance |

A further example is:

| | Per cent |
|---|---|
| Silver | 15 |
| Cadmium | 8 to 12 |
| Sodium | .2 to 6 |
| Copper | Balance |

The following are examples of alloys containing phosphorus:

| | Per cent | | Per cent |
|---|---|---|---|
| Silver | 10 to 15 | Zinc | 7 to 12 |
| Cadmium | 10 to 15 | Sodium | .05 to 1.0 |
| Copper | 55 to 70 | Phosphorus | .04 to 1.5 |

A preferred phosphorus-containing alloy is:

| | Per cent |
|---|---|
| Silver | 13.5 |
| Cadmium | 14.0 |
| Sodium | 0.25 |
| Zinc | 8.75 |
| Phosphorus | 1.5 |
| Copper | 62.0 |

Another alloy of the same general type is:

| | Per cent |
|---|---|
| Silver | 13.5 |
| Cadmium | 11.0 |
| Sodium | 0.25 |
| Zinc | 8.75 |
| Phosphorus | 1.5 |
| Copper | 65.0 |

The term "silver group metal" is used in the claims to indicate silver or gold or mixtures thereof.

This application is a continuation-in-part of my co-pending application Serial No. 261,345, filed March 11, 1939.

The foregoing detailed description has been given for clearness of understanding only, and no unnecessary limitations should be understood therefrom.

What I claim as new, and desire to secure by Letters Patent, is:

1. A hard solder consisting of:

| | Per cent |
|---|---|
| Sodium | 0.1 to 2.5 |
| Silver | 40 to 60 |
| Copper | 12 to 24 |
| Cadmium | 8 to 14 |
| Zinc | 15 to 22 | the amount of impurities being insufficient to alter the properties of the alloy.

2. A hard solder consisting of:

| | Per cent |
|---|---|
| Sodium | 1 to 2 |
| Silver | 48 to 52 |
| Zinc | 17 to 21 |
| Cadmium | 11 to 13 |
| Copper | 16 to 20 | the amount of impurities being insufficient to alter the properties of the alloy.

3. A hard solder consisting of:

| | Per cent |
|---|---|
| Silver | 50 |
| Copper | 18 |
| Zinc | 19 |
| Sodium | 1 |
| Cadmium | 12 |

4. A hard solder consisting of 0.05% to 5.00% of sodium, 40% to 60% of silver, the balance being all substantially from the group consisting of zinc, cadmium and copper, the zinc constituting from 17% to 21% thereof, the amount of cadmium being at least 11% and not more than 15%, and the amount of copper being from 16% to 20%, the amount of impurities being insufficient to alter the properties of the alloy.

MELVIN M. GOLDSMITH.